(12) United States Patent     (10) Patent No.:   US 12,683,933 B2

Gururaj et al.     (45) Date of Patent:     Jul. 14, 2026

(54) SYSTEMS AND METHODS FOR PROCESSING NETWORK COMMUNICATIONS

(71) Applicant: Sophos Limited, Abingdon (GB)

(72) Inventors: Hariprasad Nekkare Gururaj, Bangalore (IN); Venkata Suresh Reddy Obulareddy, Bangalore (IN)

(73) Assignee: Sophos Limited (GB)

( * ) Notice: Subject to any disclaimer, the term of this patent is extended or adjusted under 35 U.S.C. 154(b) by 70 days.

(21) Appl. No.: 18/435,904

(22) Filed: Feb. 7, 2024

(65) Prior Publication Data

US 2025/0254149 A1     Aug. 7, 2025

(51) Int. Cl.
    *H04L 9/40*         (2022.01)
    *H04L 67/1008*    (2022.01)

(52) U.S. Cl.
    CPC ........ *H04L 63/0281* (2013.01); *H04L 63/029* (2013.01); *H04L 67/1008* (2013.01)

(58) Field of Classification Search
    CPC .............. H04L 63/0281; H04L 63/029; H04L 67/1008
    See application file for complete search history.

(56) References Cited

U.S. PATENT DOCUMENTS

| | | | |
|---|---|---|---|
| 6,523,027 | B1 | 2/2003 | Underwood |
| 6,584,567 | B1 | 6/2003 | Bellwood et al. |
| 7,480,737 | B2 | 1/2009 | Chauffour et al. |
| 8,984,617 | B1 | 3/2015 | Fausak |

| | | | |
|---|---|---|---|
| 9,154,488 | B2 | 10/2015 | Innes et al. |
| 9,274,825 | B2 | 3/2016 | Sridharan et al. |
| 9,325,615 | B2 | 4/2016 | Wu |
| 9,397,932 | B2 | 7/2016 | Nunberg et al. |
| 9,531,676 | B2 | 12/2016 | Wang et al. |
| 9,811,365 | B2 | 11/2017 | Borthakur |
| 9,973,387 | B1 * | 5/2018 | Li ......................... H04L 69/162 |
| 10,084,873 | B2 | 9/2018 | Dornemann |
| 10,389,775 | B2 | 8/2019 | Roy et al. |

(Continued)

FOREIGN PATENT DOCUMENTS

| | | |
|---|---|---|
| CN | 108270878 A | 7/2018 |
| CN | 108418713 A | 8/2018 |

(Continued)

OTHER PUBLICATIONS

John Lange et al, "Transparent Network Services via a Virtual Traffic Layer for Virtual Machines", HPDC 07—Proceedings of the 16th international symposium on High performance distributed computing, Jun. 25-29, 2007, Monterey, USA.

*Primary Examiner* — Gil H. Lee

(74) *Attorney, Agent, or Firm* — Danielson Legal LLC

(57)        ABSTRACT

Systems and methods for processing an electronic network communication. The method includes receiving a request at a first proxy service to access a network endpoint device; referencing, by the first proxy service, a database to identify a second proxy service, wherein the second proxy service is identified based on having a previously-established secure tunnel with the network endpoint device; forwarding the request from the first proxy service to the second proxy service; and forwarding the request from the second proxy service through the previously-established secure tunnel to the network endpoint device.

20 Claims, 5 Drawing Sheets

(56) References Cited

U.S. PATENT DOCUMENTS

| | | | |
|---|---|---|---|
| 10,419,394 B2 | 9/2019 | Chou et al. | |
| 10,511,584 B1 | 12/2019 | Baer et al. | |
| 10,754,678 B2 | 8/2020 | Govardhan | |
| 10,873,567 B2 | 12/2020 | Rawat et al. | |
| 11,140,162 B2 | 10/2021 | Wang | |
| 11,190,374 B2 | 11/2021 | Shribman et al. | |
| 11,349,806 B2 | 5/2022 | Atanasov | |
| 11,425,113 B2 | 8/2022 | Allen et al. | |
| 11,582,321 B2 | 2/2023 | Zhang | |
| 11,625,280 B2 | 4/2023 | Anderson et al. | |
| 11,652,697 B1 | 5/2023 | Kozlovski et al. | |
| 2010/0091768 A1* | 4/2010 | Gilbert | H04M 7/0075 |
| | | | 370/352 |
| 2014/0201308 A1* | 7/2014 | Rhea | H04L 12/2854 |
| | | | 709/213 |
| 2014/0279195 A1* | 9/2014 | Kubicki | G06Q 30/0643 |
| | | | 705/26.7 |
| 2015/0341445 A1 | 11/2015 | Nikolov et al. | |
| 2016/0212237 A1 | 7/2016 | Nishijima | |
| 2018/0054475 A1 | 2/2018 | Agarwal et al. | |
| 2018/0295134 A1* | 10/2018 | Gupta | H04L 67/56 |
| 2020/0136835 A1 | 4/2020 | Petiwala et al. | |
| 2021/0168906 A1 | 6/2021 | Zong et al. | |
| 2021/0314419 A1 | 10/2021 | Leung | |
| 2022/0309135 A1* | 9/2022 | Kawczynski | G06F 21/41 |
| 2023/0079444 A1 | 3/2023 | Parla et al. | |
| 2023/0236898 A1* | 7/2023 | McElhoe | H04L 63/0807 |
| | | | 718/1 |
| 2024/0406254 A1* | 12/2024 | Parekh | H04L 67/56 |

FOREIGN PATENT DOCUMENTS

| | | | |
|---|---|---|---|
| CN | 106453023 B | 6/2019 | |
| CN | 110351395 A | 10/2019 | |
| CN | 107040441 B | 1/2020 | |
| CN | 107800625 B | 7/2020 | |
| CN | 111756830 A | 10/2020 | |
| CN | 108471397 B | 12/2020 | |
| CN | 107689987 B | 1/2021 | |
| CN | 112383645 A | 2/2021 | |
| CN | 109257265 B | 4/2021 | |
| CN | 112702252 A | 4/2021 | |
| CN | 110309655 B | 8/2021 | |
| CN | 113938474 A | 1/2022 | |
| CN | 114338279 A | 4/2022 | |
| CN | 113098787 B | 1/2023 | |
| CN | 116033010 A | 4/2023 | |
| CN | 115174669 B | 5/2023 | |
| CN | 114629898 B | 6/2023 | |
| CN | 116232884 A | 6/2023 | |
| CN | 116248595 A | 6/2023 | |
| CN | 112994928 B | 7/2023 | |
| WO | 2015113410 A1 | 8/2015 | |
| WO | 2018103043 A1 | 6/2018 | |
| WO | 2018137369 A1 | 8/2018 | |
| WO | 2020125645 A1 | 6/2020 | |
| WO | 2023066053 A1 | 4/2023 | |

* cited by examiner

200

*PRIOR ART*

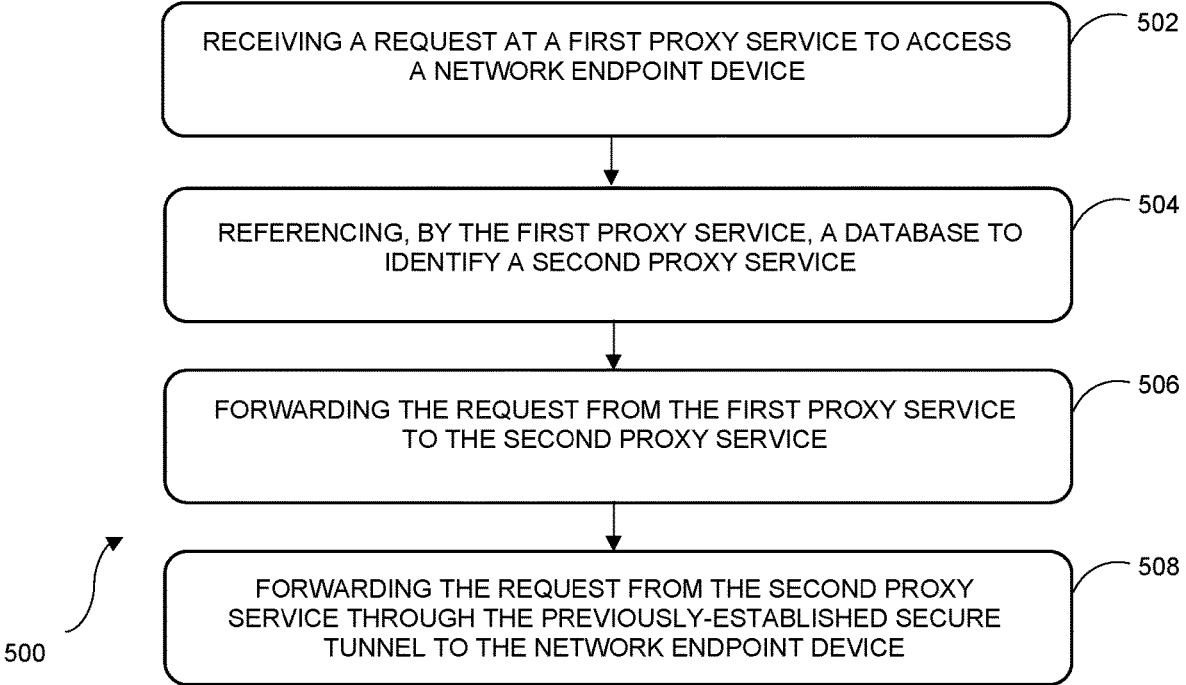

RECEIVING A REQUEST AT A FIRST PROXY SERVICE TO ACCESS A NETWORK ENDPOINT DEVICE — 502

REFERENCING, BY THE FIRST PROXY SERVICE, A DATABASE TO IDENTIFY A SECOND PROXY SERVICE — 504

FORWARDING THE REQUEST FROM THE FIRST PROXY SERVICE TO THE SECOND PROXY SERVICE — 506

FORWARDING THE REQUEST FROM THE SECOND PROXY SERVICE THROUGH THE PREVIOUSLY-ESTABLISHED SECURE TUNNEL TO THE NETWORK ENDPOINT DEVICE — 508

SYSTEMS AND METHODS FOR PROCESSING NETWORK COMMUNICATIONS

TECHNICAL FIELD

The present application relates generally to systems and methods for processing network communications and, more particularly but not exclusively, to systems and methods for processing requests to access a network resource.

BACKGROUND

Network endpoint devices are often connected to virtual machine instances or servers (for simplicity, "servers") via a secure tunnel. For example, a device such as a firewall may be connected to a server via a Secure Shell (SSH) communication tunnel. To access the webpage associated with the firewall, a user would first connect to a server and then to the firewall via the SSH communication tunnel.

In some situations, however, a user's device may not have an established tunnel with the firewall. When the user attempts to access the network endpoint device, the user's device first communicates a request to one of a plurality of servers. However, the server that receives the request may not be the server that has an established tunnel with the network endpoint device. In this situation, the server that received the request will reference a database to identify the server that has the established tunnel with the network endpoint device. The server that received the initial request may then inform the user's device which server has an established tunnel with the network endpoint device. The user's device would then send another request—this time to the correct server—to access the network endpoint device through the correct server.

This process introduces delays for the user in accessing the requested device.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

Embodiments herein provide systems and methods for processing network communications. A first proxy service may receive a request from a user to access a network endpoint device. In the prior art, if this proxy service does not have a previously established tunnel connecting it with the endpoint device, then the user may be required to make a new request to a proxy service that does have a previously established tunnel connecting it to the endpoint device.

In accord with the present embodiments, the proxy service that receives the request but lacks an established tunnel for a desired endpoint device may forward the user's request to the correct proxy service (i.e., the proxy service having the previously-established tunnel). This is in contrast to existing techniques, which require a user to make multiple requests to access the desired endpoint device. As discussed above in conjunction with existing techniques, the server providing the proxy service that receives an initial request but lacks a tunnel with the endpoint device would inform the user which server has an established tunnel with the endpoint device. In accordance with existing techniques, the user would then need to submit another request to the server with an established tunnel.

BRIEF DESCRIPTION OF DRAWINGS

Non-limiting and non-exhaustive embodiments of the invention are described with reference to the following figures, wherein like reference numerals refer to like parts throughout the various views unless otherwise specified:

FIG. 5 depicts a flowchart of a method for processing a network communication in accordance with one embodiment.

DETAILED DESCRIPTION

Figure 1:
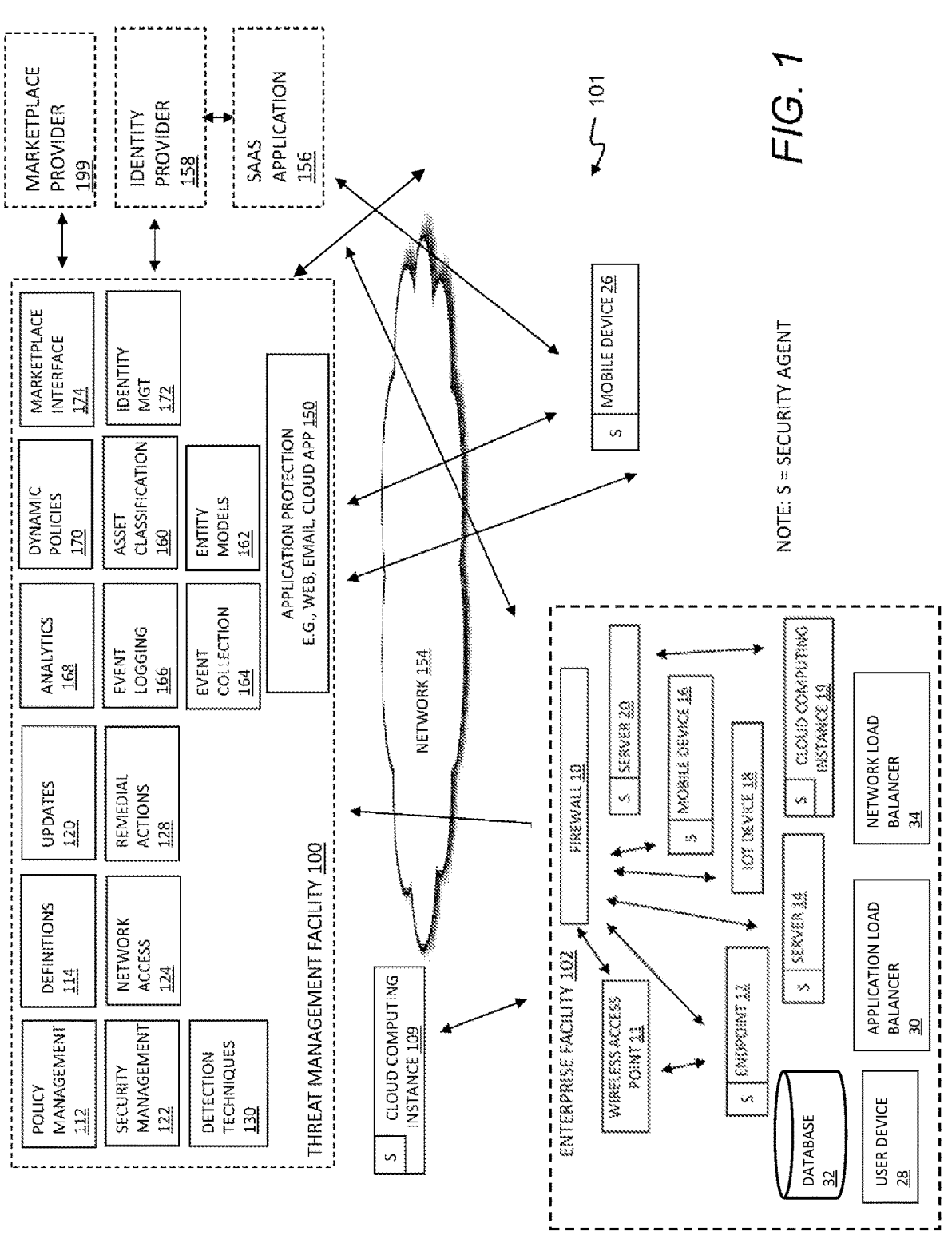
FIG. 1 illustrates a block diagram of a threat management system in accordance with one embodiment.

Various embodiments are described more fully below with reference to the accompanying drawings, which form a part hereof, and which show specific embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

In cloud-based network environments, one or more virtual computing instances may connect a user with a network endpoint device. For example, these computing instances may be provided by a cloud service such as AMAZON EC2® computing service by Amazon.com, Inc. headquartered in Seattle, Washington provided by Amazon, headquartered in Seattle, Washington. EC2 is a web service for creating and running virtual machines or "instances" in a cloud-based network environment.

These instances may connect a user such as a network administrator with one or more network appliances on the administrator's network. For example, an administrator may be tasked with monitoring activity occurring on their network and may have deployed a firewall thereon.

To monitor network activity, the user may access an interface associated with the firewall to view traffic detected by the firewall. For example, the interface may present to the user data such as devices on the network, traffic moving within the network, traffic moving from outside of the network to inside of the network, traffic moving from inside the network to outside of the network, rules enforced on the network, traffic blocked on the network, or the like.

Although the present application largely discusses firewalls as the network device or appliance of interest, features of the disclosed embodiments may be used in conjunction with any other type of network device. These may include, but are not limited to, switches, routers, modems, gateways, servers, or any other type of network appliance whether available now or invented hereafter.

Virtual machines or instances may connect the user with the desired network appliance. This connection, once established, may allow the user to access the interface associated with the appliance.

To facilitate this access, a virtual computing instance may have an established tunnel with the appliance. For example, when the firewall or computing instance is instantiated, the firewall and the computing instance may establish a secure communication tunnel therebetween. This tunnel may be a Secure Shell (SSH) tunnel, for example.

In accordance with known techniques, a user's device may not have an established tunnel with the desired firewall. When a user submits a request to access the firewall, however, the request may be communicated to an "incorrect" computing instance in that the instance does not have this previously-established tunnel with the firewall. In accordance with existing techniques, the incorrect instance would then reference a database to determine which is the "correct" computing instance (i.e., the instance that has the previously-established tunnel with the firewall).

Having identified the correct instance, the incorrect instance may provide the user with connection information for the correct instance. For example, the incorrect instance may provide the user with the internet protocol ("IP") address of the correct instance. The user may then issue a new request to the correct instance to complete the request and access the firewall.

As discussed previously, this redirect or the need to make multiple requests may result in latency and delays for the user. This is because of the time required for (1) the incorrect instance to reference the database, (2) the incorrect instance to provide the user with information for the correct instance, and (3) the user to make a new request to the correct instance.

The embodiments described herein provide novel techniques to address or otherwise avoid these delays. Rather than redirecting the user to make a new request, the "incorrect" instance may forward the received request to the correct instance. The incorrect instance may forward the request to the correct instance via a Socket Secure (SOCKS) proxy. Once the correct instance receives the request, it may forward the request to the firewall.

FIG. 1 illustrates a block diagram of a threat management system 101 providing protection against a plurality of threats, such as malware, viruses, spyware, cryptoware, adware, Trojans, spam, intrusion, policy abuse, improper configuration, vulnerabilities, improper access, uncontrolled access, and more. A threat management facility 100 may communicate with, coordinate, and control operation of security functionality at different control points, layers, and levels within the threat management system 101. A number of capabilities may be provided by a threat management facility 100, with an overall goal to intelligently use the breadth and depth of information that is available about the operation and activity of compute instances and networks as well as a variety of available controls. Another overall goal is to provide protection needed by an organization that is dynamic and able to adapt to changes in compute instances and new threats. In embodiments, the threat management facility 100 may provide protection from a variety of threats to a variety of compute instances in a variety of locations and network configurations.

As one example, users of the threat management facility 100 may define and enforce policies that control access to and use of compute instances, networks and data. Administrators may update policies such as by designating authorized users and conditions for use and access. The threat management facility 100 may update and enforce those policies at various levels of control that are available, such as by directing compute instances to control the network traffic that is allowed to traverse firewalls and wireless access points, applications and data available from servers, applications and data permitted to be accessed by endpoints, and network resources and data permitted to be run and used by endpoints. The threat management facility 100 may provide many different services, and policy management may be offered as one of the services.

Turning to a description of certain capabilities and components of the threat management system 101, the enterprise facility 102 may be or may include any networked computer-based infrastructure. For example, the enterprise facility 102 may be corporate, commercial, organizational, educational, governmental, or the like. As home networks become more complicated and include more compute instances at home and in the cloud, an enterprise facility 102 may also or instead include a personal network such as a home or a group of homes. The enterprise facility's 102 computer network may be distributed amongst a plurality of physical premises such as buildings on a campus, and located in one or in a plurality of geographical locations. The configuration of the enterprise facility as shown is by way of example, and it will be understood that there may be any number of compute instances, less or more of each type of compute instances, and other types of compute instances. As shown, the enterprise facility includes a firewall 10, a wireless access point 11, an endpoint 12, a server 14, a mobile device 16, an appliance or Internet-of-Things (IOT) device 18, a cloud computing instance 19, a server 20, a user device, an application load balancer 30, and a network load balancer 34. Again, the compute instances 10-20 depicted are by way of example, and there may be any number or types of compute instances 10-20 in a given enterprise facility. For example, in addition to the elements depicted in the enterprise facility 102, there may be one or more gateways, bridges, wired networks, wireless networks, virtual private networks, other compute instances, and so on.

The threat management facility 100 may include or otherwise be in communication certain facilities, such as a policy management facility 112, security management facility 122, update facility 120, definitions facility 114, network access facility 124, remedial action facility 128, detection techniques facility 130, one or more hosted services 132, a cloud controller 134, application protection 150, asset classification facility 160, entity model facility 162, event collection facility 164, event logging facility 166, analytics facility 168, dynamic policies facility 170, identity management facility 172, and marketplace interface facility 174, a firmware repository 176, a build system 178, as well as other facilities. For example, there may be a testing facility, a threat research facility, and other facilities (not shown). It should be understood that the threat management facility 100 may be implemented in whole or in part on a number of different compute instances, with some parts of the threat management facility on different compute instances in different locations. For example, some or all of one or more of the various facilities 100, 112-174 may be provided as part of a security agent S that is included in software running on a compute instance 10-26 within the enterprise facility 102. Some or all of one or more of the facilities 100, 112-174 may be provided on the same physical hardware or logical resource as a gateway, such as a firewall 10, or wireless access point 11. Some or all of one or more of the facilities 100, 112-174 may be provided on one or more cloud servers that are operated by the enterprise or by a security service provider, such as the cloud computing instance 109.

In embodiments, a marketplace provider 199 may make available one or more additional facilities to the enterprise facility 102 via the threat management facility 100. The marketplace provider 199 may communicate with the threat management facility 100 via the marketplace interface facility 174 to provide additional functionality or capabilities to the threat management facility 100 and compute instances 10-26. As non-limiting examples, the marketplace provider 199 may be a third-party information provider, such as a physical security event provider; the marketplace provider 199 may be a system provider, such as a human resources system provider or a fraud detection system provider; the marketplace provider 199 may be a specialized analytics provider; and so on. The marketplace provider 199, with appropriate permissions and authorization, may receive and send events, observations, inferences, controls, convictions, policy violations, or other information to the threat management facility 100. For example, the marketplace provider 199 may subscribe to and receive certain events, and in response, based on the received events and other events available to the marketplace provider 199, send inferences to the marketplace interface facility 174, and in turn to the analytics facility 168, which in turn may be used by the security management facility 122.

The identity provider 158 may be any remote identity management system or the like configured to communicate with an identity management facility 172, e.g., to confirm identity of a user as well as provide or receive other information about users that may be useful to protect against threats. In general, the identity provider 158 may be any system or entity that creates, maintains, and manages identity information for principals while providing authentication services to relying party applications, e.g., within a federation or distributed network. The identity provider 158 may, for example, offer user authentication as a service, where other applications, such as web applications, outsource the user authentication step(s) to a trusted identity provider.

In embodiments, the identity provider 158 may provide user identity information, such as multi-factor authentication, to a software-as-a-service (SaaS) application. Centralized identity providers such as Microsoft Azure, may be used by an enterprise facility instead of maintaining separate identity information for each application or group of applications, and as a centralized point for integrating multifactor authentication. In embodiments, the identity management facility 172 may communicate hygiene, or security risk information, to the identity provider 158. The identity management facility 172 may determine a risk score for a user based on the events, observations, and inferences about that user and the compute instances associated with the user. If a user is perceived as risky, the identity management facility 172 can inform the identity provider 158, and the identity provider 158 may take steps to address the potential risk, such as to confirm the identity of the user, confirm that the user has approved the SaaS application access, remediate the user's system, or such other steps as may be useful.

In embodiments, threat protection provided by the threat management facility 100 may extend beyond the network boundaries of the enterprise facility 102 to include clients (or client facilities) such as an endpoint 22 or other type of computing device outside the enterprise facility 102, a mobile device 26, a cloud computing instance 109, or any other devices, services or the like that use network connectivity not directly associated with or controlled by the enterprise facility 102, such as a mobile network, a public cloud network, or a wireless network at a hotel or coffee shop or other type of public location. While threats may come from a variety of sources, such as from network threats, physical proximity threats, secondary location threats, the compute instances 10-26 may be protected from threats even when a compute instance 10-26 is not connected to the enterprise facility 102 network, such as when compute instances 22 or 26 use a network that is outside of the enterprise facility 102 and separated from the enterprise facility 102, e.g., by a gateway, a public network, and so forth.

In some implementations, compute instances 10-26 may communicate with cloud applications, such as a SaaS application 156. The SaaS application 156 may be an application that is used by but not operated by the enterprise facility 102. Examples of commercially available SaaS applications 156 include Salesforce, Amazon Web Services (AWS) applications, Google Apps applications, Microsoft Office 365 applications and so on. A given SaaS application 156 may communicate with an identity provider 158 to verify user identity consistent with the requirements of the enterprise facility 102. The compute instances 10-26 may communicate with an unprotected server (not shown) such as a web site or a third-party application through an network 154 such as the Internet or any other public network, private network or combination thereof.

In embodiments, aspects of the threat management facility 100 may be provided as a stand-alone solution. In other embodiments, aspects of the threat management facility 100 may be integrated into a third-party product. An application programming interface (e.g., a source code interface) may be provided such that aspects of the threat management facility 100 may be integrated into or used by or with other applications. For instance, the threat management facility 100 may be stand-alone in that it provides direct threat protection to an enterprise or computer resource, where protection is subscribed to the facility 100. Alternatively, the threat management facility 100 may offer protection indirectly, through a third-party product, where an enterprise may subscribe to services through the third-party product, and threat protection to the enterprise may be provided by the threat management facility 100 through the third-party product.

The security management facility 122 may provide protection from a variety of threats by providing, as non-limiting examples, endpoint security and control, email security and control, web security and control, reputation-based filtering, machine learning classification, control of unauthorized users, control of guest and non-compliant computers, and more.

The security management facility 122 may provide malicious code protection to a compute instance. The security management facility 122 may include functionality to scan applications, files, and data for malicious code, remove or quarantine applications and files, prevent certain actions, perform remedial actions, as well as other security measures. Scanning may use any of a variety of techniques, including without limitation signatures, identities, classifiers, and other suitable scanning techniques. In embodiments, the scanning may include scanning some or all files on a periodic basis, scanning an application when the application is executed, scanning data transmitted to or from a device, scanning in response to predetermined actions or combinations of actions, and so forth. The scanning of applications, files, and data may be performed to detect known or unknown malicious code or unwanted applications. Aspects of the malicious code protection may be provided, for example, in a security agent of an endpoint 12, in a wireless access point 11 or firewall 10, as part of application protection 150 provided by the cloud, and so on.

In an embodiment, the security management facility 122 may provide for email security and control, for example to target spam, viruses, spyware and phishing, to control email content, and the like. Email security and control may protect against inbound and outbound threats, protect email infrastructure, prevent data leakage, provide spam filtering, and more. Aspects of the email security and control may be provided, for example, in the security agent of an endpoint 12, in a wireless access point 11 or firewall 12, as part of application protection 150 provided by the cloud, and so on.

In an embodiment, security management facility 122 may provide for web security and control, for example, to detect or block viruses, spyware, malware, or unwanted applications; help control web browsing; and the like, which may provide comprehensive web access control to enable safe and productive web browsing. Web security and control may provide Internet use policies, reporting on suspect compute instances, security and content filtering, active monitoring of network traffic, Uniform Resource Identifier (URI) filtering, and the like. Aspects of the web security and control may be provided, for example, in the security agent of an endpoint 12, in a wireless access point 11 or firewall 10, as part of application protection 150 provided by the cloud, and so on.

In an embodiment, the security management facility 122 may provide for network access control, which generally controls access to and use of network connections. Network control may stop unauthorized, guest, or non-compliant systems from accessing networks, and may control network traffic that is not otherwise controlled at the client level. In addition, network access control may control access to virtual private networks (VPN), where VPNs may, for example, include communications networks tunneled through other networks and establishing logical connections acting as virtual networks. In embodiments, a VPN may be treated in the same manner as a physical network. Aspects of network access control may be provided, for example, in the security agent of an endpoint 12, in a wireless access point 11 or firewall 10, as part of application protection 150 provided by the cloud, e.g., from the threat management facility 100 or other network resource(s).

In an embodiment, the security management facility 122 may provide for host intrusion prevention through behavioral monitoring and/or runtime monitoring, which may guard against unknown threats by analyzing application behavior before or as an application runs. This may include monitoring code behavior, application programming interface calls made to libraries or to the operating system, or otherwise monitoring application activities. Monitored activities may include, for example, reading and writing to memory, reading and writing to disk, network communication, process interaction, and so on. Behavior and runtime monitoring may intervene if code is deemed to be acting in a manner that is suspicious or malicious. Aspects of behavior and runtime monitoring may be provided, for example, in the security agent of an endpoint 12, in a wireless access point 11 or firewall 10, as part of application protection 150 provided by the cloud, and so on.

In an embodiment, the security management facility 122 may provide for reputation filtering, which may target or identify sources of known malware. For instance, reputation filtering may include lists of URIs of known sources of malware or known suspicious IP addresses, code authors, code signers, or domains, that when detected may invoke an action by the threat management facility 100. Based on reputation, potential threat sources may be blocked, quarantined, restricted, monitored, or some combination of these, before an exchange of data can be made. Aspects of reputation filtering may be provided, for example, in the security agent of an endpoint 12, in a wireless access point 11 or firewall 10, as part of application protection 150 provided by the cloud, and so on. In embodiments, some reputation information may be stored on a compute instance 10-26, and other reputation data available through cloud lookups to an application protection lookup database, such as may be provided by application protection 150.

In embodiments, information may be sent from the enterprise facility 102 to a third party, such as a security vendor, or the like, which may lead to improved performance of the threat management facility 100. In general, feedback may be useful for any aspect of threat detection. For example, the types, times, and number of virus interactions that an enterprise facility 102 experiences may provide useful information for the preventions of future virus threats. Feedback may also be associated with behaviors of individuals within the enterprise, such as being associated with most common violations of policy, network access, unauthorized application loading, unauthorized external device use, and the like. In embodiments, feedback may enable the evaluation or profiling of client actions that are violations of policy that may provide a predictive model for the improvement of enterprise policies.

An update facility 120 may provide control over when updates are performed. The updates may be automatically transmitted, manually transmitted, or some combination of these. Updates may include software, definitions, reputations or other code or data that may be useful to the various facilities. For example, the update facility 120 may manage receiving updates from a provider, distribution of updates to enterprise facility 102 networks and compute instances, or the like. In embodiments, updates may be provided to the enterprise facility's 102 network, where one or more compute instances on the enterprise facility's 102 network may distribute updates to other compute instances.

The threat management facility 100 may include a policy management facility 112 that manages rules or policies for the enterprise facility 102. Examples of rules include access permissions associated with networks, applications, compute instances, users, content, data, and the like. The policy management facility 112 may use a database, a text file, other data store, or a combination to store policies. In an embodiment, a policy database may include a block list, a black list, an allowed list, a white list, and more. As a few non-limiting examples, policies may include a list of enterprise facility 102 external network locations/applications that may or may not be accessed by compute instances, a list of types/classifications of network locations or applications that may or may not be accessed by compute instances, and contextual rules to evaluate whether the lists apply. For example, there may be a rule that does not permit access to sporting websites. When a website is requested by the client facility, a security management facility 122 may access the rules within a policy facility to determine if the requested access is related to a sporting website.

The policy management facility 112 may include access rules and policies that are distributed to maintain control of access by the compute instances 10-26 to network resources. These policies may be defined for an enterprise facility, application type, subset of application capabilities, organization hierarchy, compute instance type, user type, network location, time of day, connection type, or any other suitable definition. Policies may be maintained through the threat management facility 100, in association with a third party, or the like. For example, a policy may restrict instant messaging (IM) activity by limiting such activity to support personnel when communicating with customers. More generally, this may allow communication for departments as necessary or helpful for department functions, but may otherwise preserve network bandwidth for other activities by restricting the use of IM to personnel that need access for a specific purpose. In an embodiment, the policy management facility 112 may be a stand-alone application, may be part of the network server facility 142, may be part of the enterprise facility 102 network, may be part of the client facility, or any suitable combination of these.

The policy management facility 112 may include dynamic policies that use contextual or other information to make security decisions. As described herein, the dynamic policies facility 170 may generate policies dynamically based on observations and inferences made by the analytics facility. The dynamic policies generated by the dynamic policy facility 170 may be provided by the policy management facility 112 to the security management facility 122 for enforcement.

In embodiments, the threat management facility 100 may provide configuration management as an aspect of the policy management facility 112, the security management facility 122, or some combination. Configuration management may define acceptable or required configurations for the compute instances 10-26, applications, operating systems, hardware, or other assets, and manage changes to these configurations. Assessment of a configuration may be made against standard configuration policies, detection of configuration changes, remediation of improper configurations, application of new configurations, and so on. An enterprise facility may have a set of standard configuration rules and policies for particular compute instances which may represent a desired state of the compute instance. For example, on a given compute instance 12, 14, 18, a version of a client firewall may be required to be running and installed. If the required version is installed but in a disabled state, the policy violation may prevent access to data or network resources. A remediation may be to enable the firewall. In another example, a configuration policy may disallow the use of Universal Serial Bus (USB) disks, and the policy management facility 112 may require a configuration that turns off USB drive access via a registry key of a compute instance. Aspects of configuration management may be provided, for example, in the security agent of an endpoint 12, in a wireless access point 11 or firewall 10, as part of application protection 150 provided by the cloud, or any combination of these.

In embodiments, the threat management facility 100 may also provide for the isolation or removal of certain applications that are not desired or may interfere with the operation of a compute instance 10-26 or the threat management facility 100, even if such application is not malware per se. The operation of such products may be considered a configuration violation. The removal of such products may be initiated automatically whenever such products are detected, or access.

The policy management facility 112 may also require update management (e.g., as provided by the update facility 120). Update management for the security management facility 122 and policy management facility 112 may be provided directly by the threat management facility 100, or, for example, by a hosted system. In embodiments, the threat management facility 100 may also provide for patch management, where a patch may be an update to an operating system, an application, a system tool, or the like, where one of the reasons for the patch is to reduce vulnerability to threats.

In embodiments, the security management facility 122 and policy management facility 112 may push information to the enterprise facility 102 network and/or the compute instances 10-26, the enterprise facility 102 network and/or compute instances 10-26 may pull information from the security management facility 122 and policy management facility 112, or there may be a combination of pushing and pulling of information. For example, the enterprise facility 102 network and/or compute instances 10-26 may pull update information from the security management facility 122 and policy management facility 112 via the update facility 120, an update request may be based on a time period, by a certain time, by a date, on demand, or the like. In another example, the security management facility 122 and policy management facility 112 may push the information to the enterprise facility's 102 network and/or compute instances 10-26 by providing notification that there are updates available for download and/or transmitting the information. In an embodiment, the policy management facility 112 and the security management facility 122 may work in concert with the update facility 120 to provide information to the enterprise facility's 102 network and/or compute instances 10-26. In various embodiments, policy updates, security updates and other updates may be provided by the same or different modules, which may be the same or separate from a security agent running on one of the compute instances 10-26.

As threats are identified and characterized, the definition facility 114 of the threat management facility 100 may manage definitions used to detect and remediate threats. For example, identity definitions may be used for scanning files, applications, data streams, etc. for the determination of malicious code. Identity definitions may include instructions and data that can be parsed and acted upon for recognizing features of known or potentially malicious code. Definitions also may include, for example, code or data to be used in a classifier, such as a neural network or other classifier that may be trained using machine learning. Updated code or data may be used by the classifier to classify threats. In embodiments, the threat management facility 100 and the compute instances 10-26 may be provided with new definitions periodically to include most recent threats. Updating of definitions may be managed by the update facility 120, and may be performed upon request from one of the compute instances 10-26, upon a push, or some combination. Updates may be performed upon a time period, on demand from a device 10-26, upon determination of an important new definition or a number of definitions, and so on.

A threat research facility (not shown) may provide a continuously ongoing effort to maintain the threat protection capabilities of the threat management facility 100 in light of continuous generation of new or evolved forms of malware. Threat research may be provided by researchers and analysts working on known threats, in the form of policies, definitions, remedial actions, and so on.

The security management facility 122 may scan an outgoing file and verify that the outgoing file is permitted to be transmitted according to policies. By checking outgoing files, the security management facility 122 may be able discover threats that were not detected on one of the compute instances 10-26, or policy violation, such transmittal of information that should not be communicated unencrypted.

The threat management facility 100 may control access to the enterprise facility 102 networks. A network access facility 124 may restrict access to certain applications, networks, files, printers, servers, databases, and so on. In addition, the network access facility 124 may restrict user access under certain conditions, such as the user's location, usage history, need to know, job position, connection type, time of day, method of authentication, client-system configuration, or the like. Network access policies may be provided by the policy management facility 112, and may be developed by the enterprise facility 102, or pre-packaged by a supplier. Network access facility 124 may determine if a given compute instance 10-22 should be granted access to a requested network location, e.g., inside or outside of the enterprise facility 102. Network access facility 124 may determine if a compute instance 22, 26 such as a device outside the enterprise facility 102 may access the enterprise facility 102. For example, in some cases, the policies may require that when certain policy violations are detected, certain network access is denied. The network access facility 124 may communicate remedial actions that are necessary or helpful to bring a device back into compliance with policy as described below with respect to the remedial action facility 128. Aspects of the network access facility 124 may be provided, for example, in the security agent of the endpoint 12, in a wireless access point 11, in a firewall 10, as part of application protection 150 provided by the cloud, and so on.

In an embodiment, the network access facility 124 may have access to policies that include one or more of a block list, a black list, an allowed list, a white list, an unacceptable network site database, an acceptable network site database, a network site reputation database, or the like of network access locations that may or may not be accessed by the client facility. Additionally, the network access facility 124 may use rule evaluation to parse network access requests and apply policies. The network access facility 124 may have a generic set of policies for all compute instances, such as denying access to certain types of websites, controlling instant messenger accesses, or the like. Rule evaluation may include regular expression rule evaluation, or other rule evaluation method(s) for interpreting the network access request and comparing the interpretation to established rules for network access. Classifiers may be used, such as neural network classifiers or other classifiers that may be trained by machine learning.

The threat management facility 100 may include an asset classification facility 160. The asset classification facility will discover the assets present in the enterprise facility 102. A compute instance such as any of the compute instances 10-26 described herein may be characterized as a stack of assets. The one level asset is an item of physical hardware. The compute instance may be, or may be implemented on physical hardware, and may have or may not have a hypervisor, or may be an asset managed by a hypervisor. The compute instance may have an operating system (e.g., Windows, macOS, OS X, Linux, Android, IOS). The compute instance may have one or more layers of containers.

The compute instance may have one or more applications, which may be native applications, e.g., for a physical asset or virtual machine, or running in containers within a computing environment on a physical asset or virtual machine, and those applications may link libraries or other code or the like, e.g., for a user interface, cryptography, communications, device drivers, mathematical or analytical functions and so forth. The stack may also interact with data. The stack may also or instead interact with users, and so users may be considered assets.

The threat management facility 100 may include the entity model facility 162. The entity models may be used, for example, to determine the events that are generated by assets. For example, some operating systems may provide useful information for detecting or identifying events. For examples, operating systems may provide process and usage information that accessed through an application programming interface (API). As another example, it may be possible to instrument certain containers to monitor the activity of applications running on them. As another example, entity models for users may define roles, groups, permitted activities and other attributes.

The event collection facility 164 may be used to collect events from any of a wide variety of sensors that may provide relevant events from an asset, such as sensors on any of the compute instances 10-26, the application protection 150, a cloud computing instance 109 and so on. The events that may be collected may be determined by the entity models. There may be a variety of events collected. Events may include, for example, events generated by the enterprise facility 102 or the compute instances 10-26, such as by monitoring streaming data through a gateway such as firewall 10 and wireless access point 11, monitoring activity of compute instances, monitoring stored files/data on the compute instances 10-26 such as desktop computers, laptop computers, other mobile computing devices, and cloud computing instances 19, 109. Events may range in granularity. One example of an event is the communication of a specific packet over the network. Another example of an event may be identification of an application that is communicating over a network.

The event logging facility 166 may be used to store events collected by the event collection facility 164. The event logging facility 166 may store collected events so that they can be accessed and analyzed by the analytics facility 168. Some events may be collected locally, and some events may be communicated to an event store in a central location or cloud facility. Events may be logged in any suitable format.

Events collected by the event logging facility 166 may be used by the analytics facility 168 to make inferences and observations about the events. These observations and inferences may be used as part of policies enforced by the security management facility Observations or inferences about events may also be logged by the event logging facility 166.

When a threat or other policy violation is detected by the security management facility 122, the remedial action facility 128 may remediate the threat. Remedial action may take a variety of forms, non-limiting examples including collecting additional data about the threat, terminating or modifying an ongoing process or interaction, sending a warning to a user or administrator, downloading a data file with commands, definitions, instructions, or the like to remediate the threat, requesting additional information from the requesting device, such as the application that initiated the activity of interest, executing a program or application to remediate against a threat or violation, increasing telemetry or recording interactions for subsequent evaluation, (continuing to) block requests to a particular network location or locations, scanning a requesting application or device, quarantine of a requesting application or the device, isolation of the requesting application or the device, deployment of a sandbox, blocking access to resources, e.g., a USB port, or other remedial actions. More generally, the remedial action facility 128 may take any steps or deploy any measures suitable for addressing a detection of a threat, potential threat, policy violation or other event, code or activity that might compromise security of a computing instance 10-26 or the enterprise facility 102.

Figure 2:
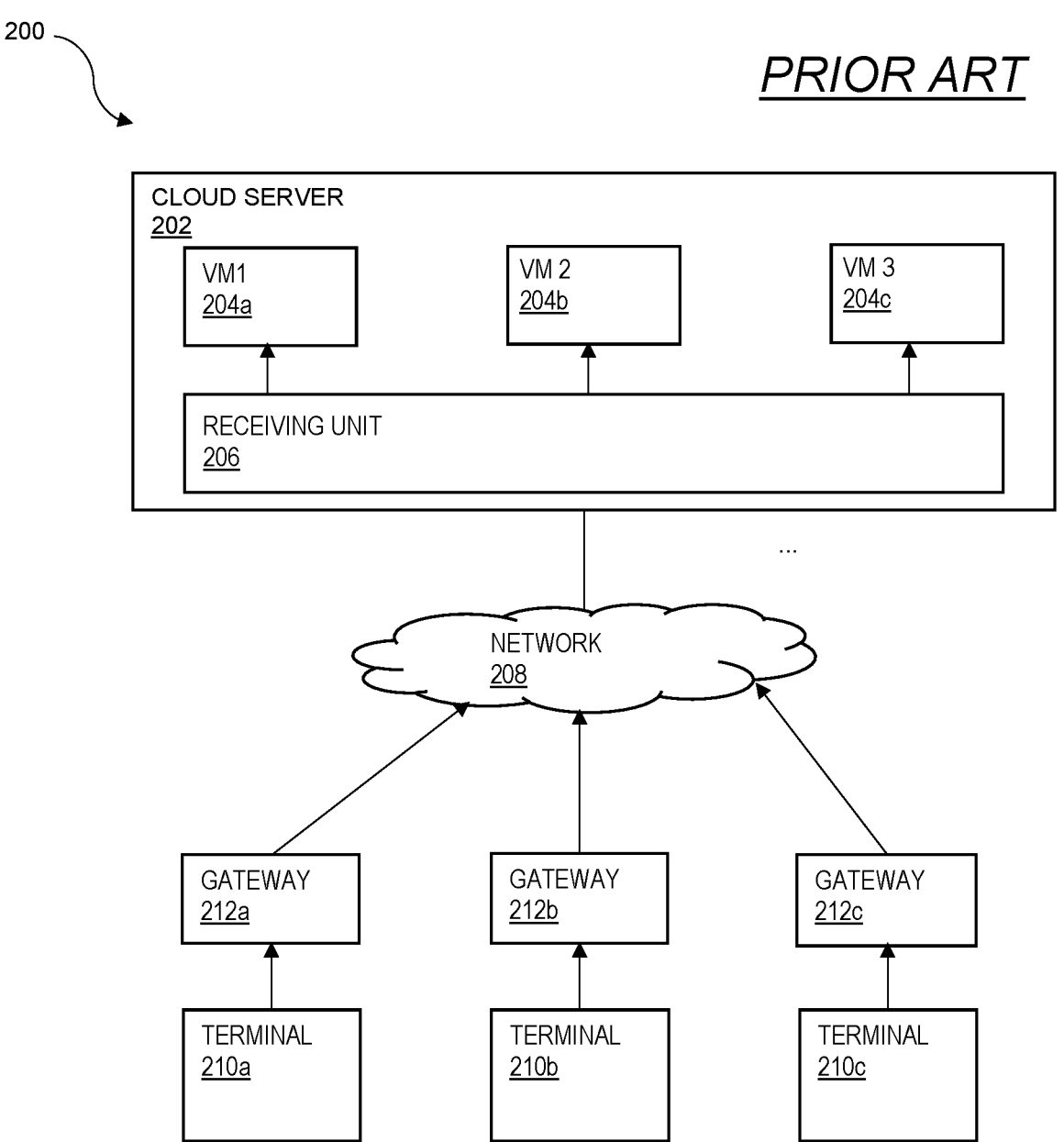
FIG. 2 illustrates a system for processing a network communication in accordance with existing techniques.

FIG. 2 illustrates a system 200 for processing a network communication in accordance with existing techniques. The system 200 includes a cloud server 202 with virtual machines 204a, 204b, and 204c, and a receiving unit 206 for passing instructions to the virtual machines 204a, 204b, and 204c. The cloud server 202 may be accessible over a network 208 and in communication with terminals 210a, 210b, and 210c. Each terminal 210a-c may have a dedicated access tunnel with a respective gateway 212a-c. That is, terminal 210a has a dedicated access tunnel with gateway 212a, terminal 210b has a dedicated access tunnel with gateway 212b, etc.

In operation, each virtual machine 204a-c may be associated with a particular function or application, and have a dedicated access tunnel with the corresponding gateway 212a-c. Accordingly, when a request is sent from a terminal, the intended virtual machine is known, and the request can be forwarded to the intended virtual machine.

Often times, however, there may not be an established tunnel from an endpoint device to a desired network resource. Similarly, a user may not know which instance has an established tunnel with the desired network resource. Accordingly, a user may make a request, but the request may reach a virtual machine instance that does not have an established tunnel with the desired network resource. In this case, a user then have to make a second request.

Figure 3:
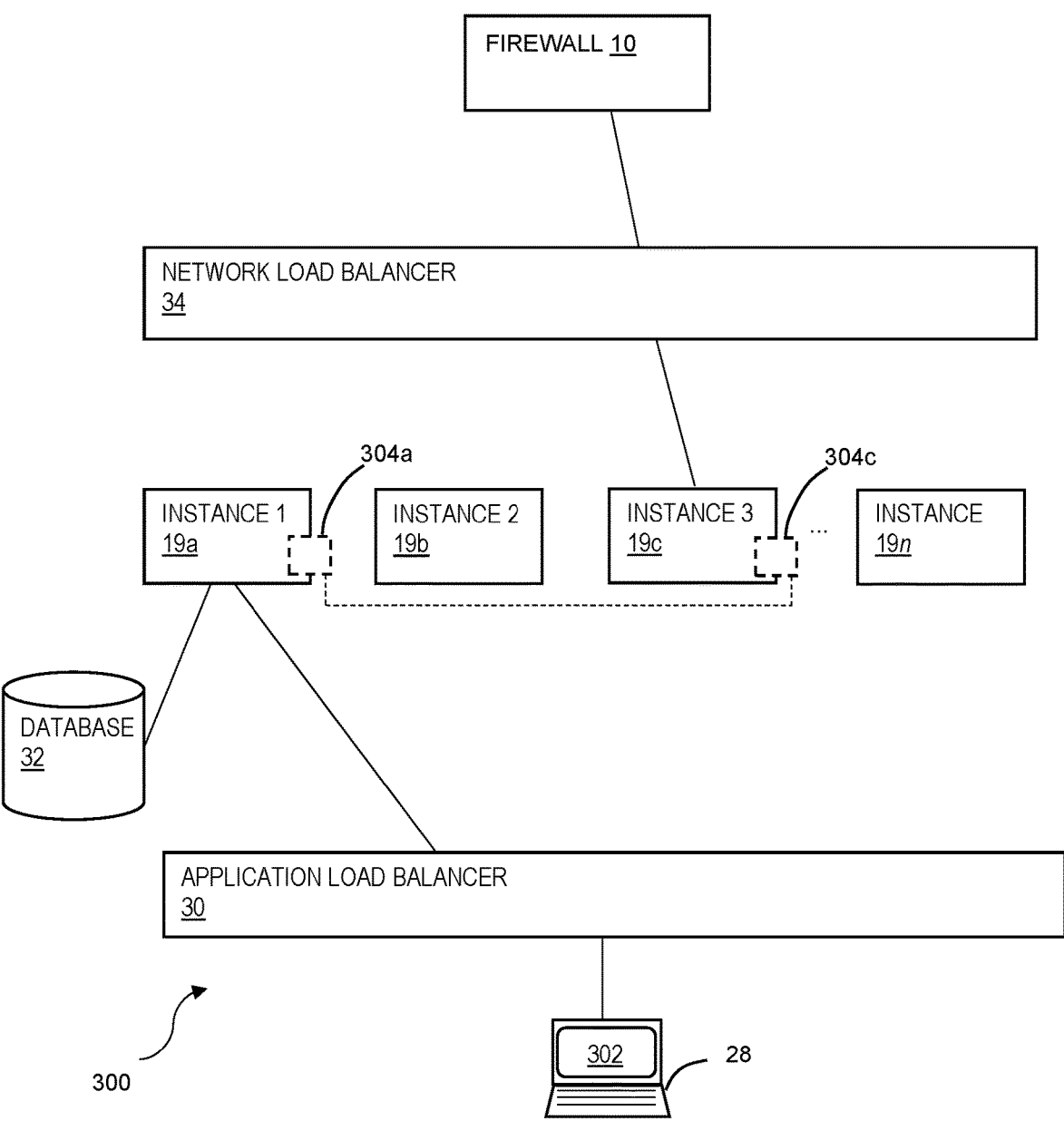
FIG. 3 illustrates a system for processing a network communication in accordance with one embodiment.

FIG. 3 illustrates a system 300 for processing a network communication in accordance with one embodiment. The system 300 may be instantiated by the enterprise facility 102 of FIG. 1 and include components shown in FIG. 1. For example, the system 300 may include one or more user devices 28 executing a user interface 302. The system 300 may further include the firewall 10, cloud compute instances 19a, 19b, 19c, . . . 19n, where n is the number of cloud compute instances in or otherwise associated with the enterprise facility 102, the application load balancer (ALB) 30, the network load balancer (NLB) 34, and one or more databases 32. The instances 19a-n of FIG. 4 each include a proxy component (e.g., instance 19a includes proxy component 304a, instance 19c includes proxy component 304c, etc. These proxy components may use the Socket Secure network protocol to communicate with each other, or at the very least to enable the instance 19a to forward a request to instance 19c. The instance 19c may then forward 424 the request to the firewall 10. The firewall 10 may transmit any appropriate response 426 to acknowledge the request.

Figure 4:
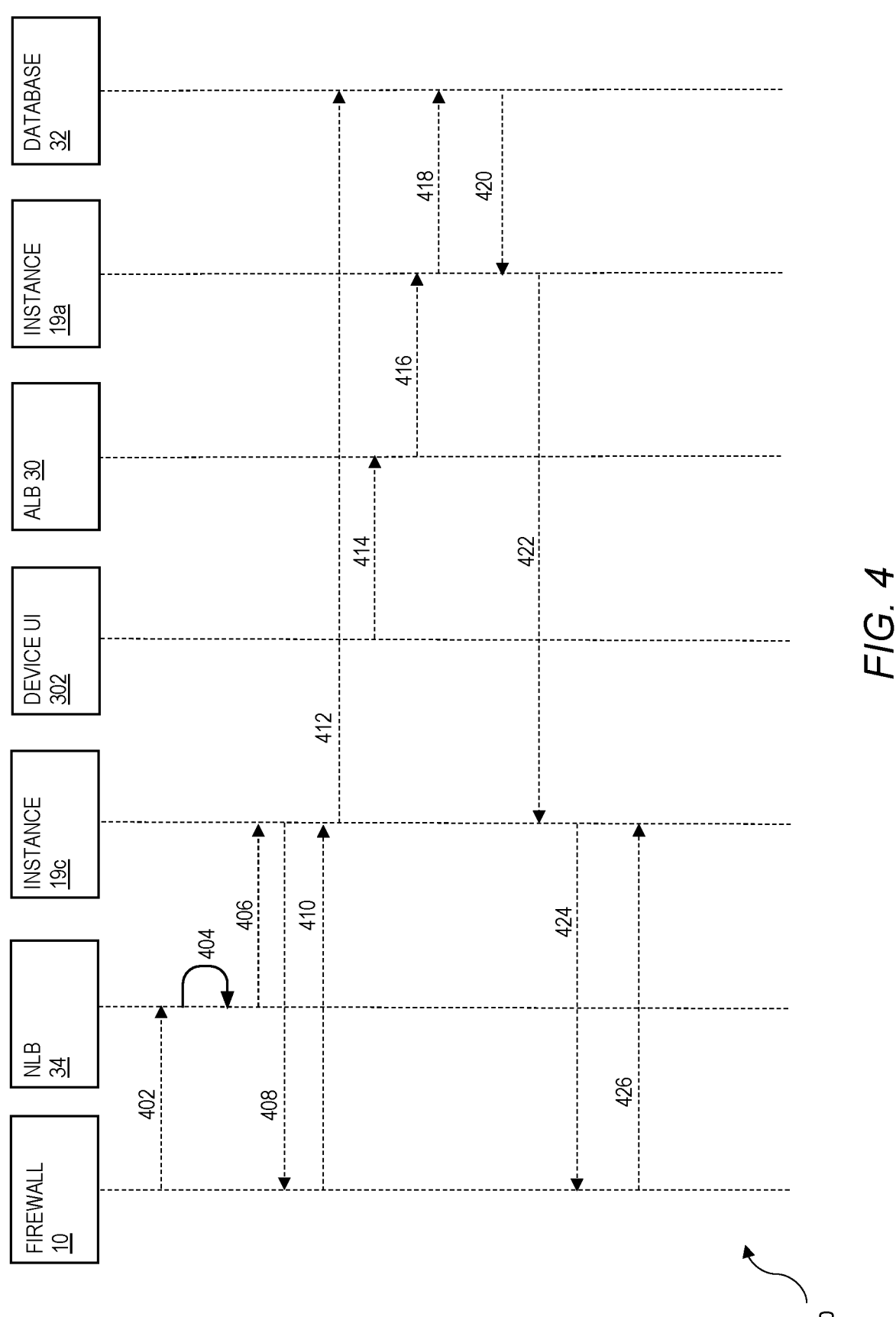
FIG. 4 depicts a message sequence diagram for processing a network communication in accordance with one embodiment.

FIG. 4 illustrates a message sequence diagram 400 for processing a network communication in accordance with one embodiment. The message sequence diagram 500 references the components of FIG. 4.

When the firewall 10 is initiated, it may first send a request 402 to the NLB 34. The request may be to establish a connection with one of the compute instances 19a-n. The NLB 34 may monitor or otherwise track how many connections are established with instances 19a-n, and may distribute incoming requests based on one or more rules. For example, the NLB 34 may perform a check 404 with an internal counting mechanism to determine which instances are the most or least loaded.

In FIG. 4, the NLB 34 identified that instance 19*c* is the least loaded of the instances 19*a-n*, and forwards the request 406 to instance 19*c*. The instance 19*c* may respond to the request 408, such as part of a handshake procedure, and a secure tunnel may be established 410 between the firewall 10 and the instance 19*c*. The secure tunnel between the firewall 10 and the instance 19*c* may be an SSH tunnel. The instance 19*c* may also communicate details of the connection 512 to the database 32 for later retrieval.

Some time later, a user of the user device may attempt to access the firewall 10. For example, the user may be a network administrator tasked with monitoring a network, and may want to view a user interface associated with the firewall 10 to view activity occurring on their network. For example, the user interface 302 may execute a browser to issue a request 514 to access the firewall 10. The request may be communicated to the ALB 30, and may be an HTTPS or HTTP request including a network resource locator. The embodiments described herein may also implement single sign-on (SSO) authentication methods to allow a user to authenticate with multiple instances and network resources using a single set of credentials.

The ALB 30 may receive requests and make routing decisions at the application layer. The ALB may direct the request 416 to an instance such as instance 19*a*. As shown in FIGS. 3 and 4, however, instance 19*a* is not the instance that has the established tunnel with the firewall 10.

Upon receipt of the request, the instance 19*a* may reference 418 the database 32 to identify which instance 19*b-n* has the established tunnel with the firewall 10. As seen in FIGS. 3 and 4, the instance 19*a* may identify 420 that instance 19*c* has the established tunnel.

Rather than having the instance 19*a* relay this information to the ALB 30, the instance 19*a* forwards the request 422 to instance 19*c* directly. For example, the instance 19*a* may use the SOCKS proxy to forward the request to the instance 19*c*.

Accordingly, each of the instances 19*a-n* may have at least three ports open. These may include a first port to establish an SSH connection with the firewall 10 via the NLB 34, a second port to establish a connection with the ALB 30, and a third, SOCKS proxy port to establish a connection with another instance. As discussed previously, the instances 19*a-n* may use an HTTP port to connect to the ALB 30. The SOCKS proxy on each instance may only be accessed by other instances for security purposes.

Accordingly, instances 19*a* and 19*c* may each be configured with a proxy component 404*a* and 404*c*, respectively. As discussed above, these proxy components 404*a* and 404*c* may communicate with each other, or at the very least to enable the instance 19*a* to forward the request to instance 19*c*. The instance 19*c* may then forward 524 the request to the firewall 10. The firewall 10 may transmit any appropriate response 526 to acknowledge the request.

FIG. 5 depicts a flowchart of a method 500 for processing an electronic communication in accordance with one embodiment. The components of FIG. 1 may perform the steps of method 500.

Step 502 involves receiving a request at a first proxy service 302*a* to access a network endpoint device. The network endpoint device may be associated with an endpoint device such as a firewall 10, for example. The proxy service 302*a* may be associated with a compute instance 19*a*. The compute instance 19*a* may be a cloud computing service such as the AMAZON EC2® computing service by Amazon.com, Inc. headquartered in Seattle, Washington.

Step 504 involves referencing, by the first proxy service 304*a*, a database 32 to identify a second proxy service 404*c*, wherein the second proxy service 404*c* is identified based on having a previously-established secure tunnel with the network endpoint device. Specifically, the second proxy service 304*c* may be executed by or otherwise associated with a compute instance 19*c* that has a previously established tunnel with the firewall 10.

Step 506 involves forwarding the request from the first proxy service 304*a* to the second proxy service 304*c*. As discussed previously, the first proxy service 304*a* may forward the request using a SOCKS proxy.

Step 508 involves forwarding the request from the second proxy service 304*c* through the previously-established secure tunnel to the network endpoint device associated with the firewall 10. Accordingly, the request reaches the firewall 10 without requiring a user to make a second request.

The disclosed embodiments provide novel features and advantages over existing techniques. As discussed previously, existing techniques for accessing resources such as individual firewalls over an enterprise network suffer from various drawbacks. First, these techniques generally involve establishing a secure tunnel between an appliance and one of many compute instances. When a user attempts to access the firewall, the request may not reach the instance that has the tunnel with the firewall. In fact, as the number of compute instances increases, the likelihood of the request reaching the correct instance decreases.

The described embodiments overcome these disadvantages of existing techniques by processing a network request even in situations in which an endpoint device does not have an established tunnel with a desired network resource. The described embodiments also remove redirects and obviate the need for the user to, for example, make a second request. In accordance with the described embodiments, the compute instance that receives the request may forward the request to the correct instance (i.e., the instance that has an established tunnel with the firewall). From there, the request is passed on to the firewall through the established tunnel.

Accordingly, the described embodiments do not require the user's browser to redirect to a different instance. By allowing the instance that initially received a user request to proxy the request to the correct instance, the described embodiments are quicker and require fewer processing steps in comparison to existing techniques.

According to one aspect, embodiments relate to a method for processing an electronic communication. The method includes receiving a request at a first proxy service to access a network endpoint device; referencing, by the first proxy service, a database to identify a second proxy service, wherein the second proxy service is identified based on having a previously-established secure tunnel with the network endpoint device; forwarding the request from the first proxy service to the second proxy service; and forwarding the request from the second proxy service through the previously-established secure tunnel to the network endpoint device.

In some embodiments, referencing the database involves the first proxy service querying the database to identify the second proxy service having the previously-established secure tunnel with the network endpoint device.

In some embodiments, receiving the request at the first proxy service includes receiving at an application load balancer the request and communicating the request from the application load balancer to the first proxy service.

In some embodiments, the first proxy service and the second proxy service execute in a virtual computing environment. In some embodiments, the first proxy service is configured with a first port to establish a connection with the application load balancer, a second port to establish a connection with the database, and a third port to establish a connection with the second proxy service.

In some embodiments, the first proxy service forwards the request to the second proxy service via a secure socket protocol.

In some embodiments, the method further includes establishing the secure tunnel between the second proxy service and the network endpoint device.

In some embodiments, the method further includes performing a single sign on authentication procedure associated with the request prior to forwarding the request to the network endpoint device.

According to another aspect, embodiments relate to a system for processing an electronic network communication. The system includes a plurality of proxy services executing in a virtual computing environment including a first proxy service and a second proxy service, wherein the first proxy service is configured to receive a request to access a network endpoint device, reference a database to identify that the second proxy service has a previously-established secure tunnel with the network endpoint device, and forward the request to the second proxy service; wherein the second proxy service is configured to forward the request to the network endpoint device.

In some embodiments, the first proxy service references the database by querying the database to identify the second proxy service having the previously-established secure tunnel with the network endpoint device.

In some embodiments, the system further includes an application load balancer configured to receive the request and communicate the request to the first proxy service.

In some embodiments, the first proxy service and the second proxy service execute in a virtual computing environment. In some embodiments, the first proxy service is configured with a first port to establish a connection with the application load balancer, a second port to establish a connection with the database, and a third port to establish a connection with the second proxy service.

In some embodiments, the first proxy service forwards the request to the second proxy service via a secure socket protocol.

In some embodiments, at least one of the first proxy service or the second proxy service is configured to perform a single sign on authentication procedure associated with the request prior to forwarding the request to the network endpoint device.

According to yet another aspect, embodiments relate to a computer program product for processing an electronic communication. The computer program product includes computer executable code embodied in one or more non-transitory computer readable media that, when executing on one or more processors, performs the steps of receiving a request at a first proxy service executing in a virtual computing environment to access a network endpoint device; referencing, using the first proxy service, a database to identify a second proxy service, wherein the second proxy service is identified based on having a previously-established secure tunnel with the network endpoint device; forwarding the request from the first proxy service to the second proxy service; and forwarding the request from the second proxy service through the secure tunnel to the network endpoint device.

In some embodiments, the first proxy service references the database by querying the database to identify the second proxy service having the previously-established secure tunnel with the network endpoint device.

In some embodiments, receiving the request at the first proxy service includes receiving the request at an application load balancer, and communicating the request from the application load balancer to the first proxy service. In some embodiments, the first proxy service and the second proxy service execute in a virtual computing environment.

In some embodiments, the first proxy service forwards the request to the second proxy service via a secure socket protocol.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A method for processing an electronic communication, the method comprising:
   receiving a request at a first proxy service to access a network endpoint device;
   referencing, by the first proxy service, a database to identify a second proxy service that has an established secure tunnel with the network endpoint device, wherein the first proxy service directly references the database to identify the second proxy service;
   forwarding the request from the first proxy service to the second proxy service; and
   forwarding the request from the second proxy service through the previously-established secure tunnel to the network endpoint device.

2. The method of claim 1 wherein receiving the request at the first proxy service includes:
   receiving at an application load balancer the request, and
   communicating the request from the application load balancer to the first proxy service.

3. The method of claim 1 wherein the first proxy service and the second proxy service execute in a virtual computing environment.

4. The method of claim 2 wherein the first proxy service is configured with:
   a first port to establish a connection with the application load balancer,
   a second port to establish a connection with the database, and
   a third port to establish a connection with the second proxy service.

5. The method of claim 1 wherein the first proxy service forwards the request to the second proxy service via a secure socket protocol.

6. The method of claim 1 further comprising establishing the secure tunnel between the second proxy service and the network endpoint device.

7. The method of claim 1 further comprising performing a single sign on authentication procedure associated with the request prior to forwarding the request to the network endpoint device.

8. The method of claim 1 wherein the first proxy service forwards the request to the second proxy service directly and without forwarding the request to a load balancer or router.

9. A system for processing an electronic network communication, the system comprising:
   a plurality of proxy services executing in a virtual computing environment including a first proxy service and a second proxy service, wherein the first proxy service is configured to:
      receive a request to access a network endpoint device,
      reference a database directly to identify that the second proxy service that has an established secure tunnel with the network endpoint device, and
      forward the request to the second proxy service;
   wherein the second proxy service is configured to forward the request to the network endpoint device.

10. The system of claim 9 further comprising an application load balancer configured to:
   receive the request, and
   communicate the request to the first proxy service.

11. The system of claim 9 wherein the first proxy service and the second proxy service execute in a virtual computing environment.

12. The system of claim 10 wherein the first proxy service is configured with:
   a first port to establish a connection with the application load balancer,
   a second port to establish a connection with the database, and
   a third port to establish a connection with the second proxy service.

13. The system of claim 9 wherein the first proxy service forwards the request to the second proxy service via a secure socket protocol.

14. The system of claim 9 wherein at least one of the first proxy service or the second proxy service is configured to perform a single sign on authentication procedure associated with the request prior to forwarding the request to the network endpoint device.

15. The system of claim 9 wherein the first proxy service forwards the request to the second proxy service directly and without forwarding the request to a load balancer or router.

16. A computer program product for processing an electronic communication, the computer program product comprising computer executable code embodied in one or more non-transitory computer readable media that, when executing on one or more processors, performs the steps of:
   receiving a request at a first proxy service executing in a virtual computing environment to access a network endpoint device;
   referencing, by the first proxy service, a database to identify a second proxy service that has an established secure tunnel with the network endpoint device, wherein the first proxy service directly references the database to identify the second proxy service;
   forwarding the request from the first proxy service to the second proxy service; and
   forwarding the request from the second proxy service through the secure tunnel to the network endpoint device.

17. The computer program product of claim 16 wherein receiving the request at the first proxy service includes:
   receiving the request at an application load balancer, and
   communicating the request from the application load balancer to the first proxy service.

18. The computer program product of claim 17 wherein the first proxy service and the second proxy service execute in a virtual computing environment.

19. The computer program product of claim 16 wherein the first proxy service forwards the request to the second proxy service via a secure socket protocol.

20. The computer program product of claim 16 wherein the first proxy service forwards the request to the second proxy service directly and without forwarding the request to a load balancer or router.

* * * * *